US008732770B2

(12) United States Patent
James et al.

(10) Patent No.: US 8,732,770 B2
(45) Date of Patent: *May 20, 2014

(54) DIRECT BROADCAST SIGNAL DISTRIBUTION METHODS

(75) Inventors: Thomas H. James, Pacific Palisades, CA (US); Nathan B. Zerbe, El Segundo, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,680

(22) Filed: May 27, 2011

(65) Prior Publication Data

US 2011/0231881 A1 Sep. 22, 2011

Related U.S. Application Data

(63) Continuation of application No. 10/255,344, filed on Sep. 25, 2002, now Pat. No. 7,954,127.

(51) Int. Cl.
*H04N 7/18* (2006.01)

(52) U.S. Cl.
USPC ............ 725/81; 725/68; 725/71; 725/78

(58) Field of Classification Search
USPC .......................... 725/68, 71, 74, 78
See application file for complete search history.

(56) References Cited

U.S. PATENT DOCUMENTS

| | | | | |
|---|---|---|---|---|
| 5,793,413 | A * | 8/1998 | Hylton et al. | 725/81 |
| 6,263,503 | B1 * | 7/2001 | Margulis | 725/81 |
| 6,441,793 | B1 | 8/2002 | Shea | |
| 6,622,307 | B1 * | 9/2003 | Ho | 725/120 |
| 6,678,737 | B1 | 1/2004 | Bucher | |
| 7,130,576 | B1 * | 10/2006 | Gurantz et al. | 455/3.02 |
| 7,240,357 | B1 | 7/2007 | Arsenault et al. | |
| 7,369,750 | B2 | 5/2008 | Cheng et al. | |
| 7,546,619 | B2 | 6/2009 | Anderson et al. | |
| 7,634,250 | B1 | 12/2009 | Prasad et al. | |

(Continued)

FOREIGN PATENT DOCUMENTS

| | | |
|---|---|---|
| DE | 10114082 A1 | 1/2003 |
| GB | 2377111 | 12/2002 |
| JP | 11355076 A | 12/1999 |

OTHER PUBLICATIONS

Notice of Allowance dated May 13, 2011 in U.S. Appl. No. 11/097,482, filed Apr. 1, 2005 by Thomas H. James et al.

(Continued)

*Primary Examiner* — Pankaj Kumar
*Assistant Examiner* — Timothy Newlin

(57) ABSTRACT

A direct broadcast system having a high altitude communication device that transmits broadcast signals, which are received by an antenna, is provided. The system includes an outdoor unit (ODU) electrically coupled to the antenna. The ODU includes a low noise block converter (LNB) that receives and amplifies the broadcast signals. An ODU receiver is electrically coupled to the ODU and selects a desired frequency of the broadcast signals. Integrated receiver and decoders (IRD(s) are electrically coupled to the ODU receiver via a single distribution cable. The IRD(s) convert the broadcast signals into IRD output signals. Methods of performing the same are also provided, herein, including a transport select method and a service select method for receiving the broadcast signals. A direct broadcast system installation method and wireless communication between the ODU and the IRD(s) are also provided.

25 Claims, 6 Drawing Sheets

(56) References Cited

U.S. PATENT DOCUMENTS

| | | | |
|---|---|---|---|
| 7,954,128 B2 | 5/2011 | Maynard et al. | |
| 8,001,574 B2* | 8/2011 | Hicks et al. | 725/82 |
| 2002/0163911 A1* | 11/2002 | Wee et al. | 370/389 |
| 2003/0023978 A1 | 1/2003 | Bajgrowicz | |
| 2003/0097563 A1 | 5/2003 | Moroney et al. | |
| 2004/0107436 A1 | 6/2004 | Ishizaki | |
| 2004/0123329 A1 | 6/2004 | Williams et al. | |
| 2004/0163125 A1 | 8/2004 | Phillips et al. | |
| 2004/0198237 A1 | 10/2004 | Abutaleb et al. | |
| 2004/0244059 A1 | 12/2004 | Coman | |
| 2005/0071877 A1 | 3/2005 | Navarro | |
| 2005/0089168 A1 | 4/2005 | Kahre | |
| 2005/0130590 A1 | 6/2005 | Pande et al. | |
| 2006/0112407 A1 | 5/2006 | Kakiuchi | |
| 2008/0009251 A1 | 1/2008 | Wahl et al. | |
| 2008/0127277 A1 | 5/2008 | Kuschak | |
| 2008/0134279 A1 | 6/2008 | Curtis et al. | |
| 2009/0222875 A1 | 9/2009 | Cheng et al. | |

OTHER PUBLICATIONS

Non-final Office action dated Feb. 22, 2012 in U.S. Appl. No. 11/219,407, filed Sep. 2, 2005 by Thomas H. James et al.
Non-final Office action dated Jul. 7, 2011 in U.S. Appl. No. 11/810,774, filed Jun. 7, 2007 by Hanno Basse et al.
Chinese Office action dated May 23, 2011 in Chinese Patent Application No. 200780029062.3 filed Jun. 19, 2007 by Hanno Basse et al.
EPO communication dated Jun. 25, 2012 in European divisional Patent Application No. 09075217.1 filed Apr. 3, 2006 by Thomas H. James et al.
EPO Communication dated May 31, 2011 in European Patent Application No. 06802486.8 filed Aug. 30, 2006 by Thomas H. James et al.
Final Rejection dated Jan. 18, 2012 in U.S. Appl. No. 11/810,774, filed Jun. 7, 2007 by Hanno Basse et al.
Final Rejection dated May 14, 2012 in U.S. Appl. No. 11/820,446, filed Jun. 19, 2007 by Thomas H. James et al.
EPO communication dated May 3, 2012 in European Patent Application No. 06749157.1 filed Apr. 3, 2006 by Thomas H. James et al.
EPO Notice of intent to grant dated Apr. 26, 2012 in European Patent Application No. 06749158.9 filed Apr. 3, 2006 by Thomas H. James et al.
EPO Notice of intent to grant dated Apr. 26, 2012 in European Patent Application No. 06749162.1 filed Apr. 3, 2006 by Thomas H. James et al.
Notice of Allowance dated Mar. 30, 2012 in U.S. Appl. No. 12/195,256, filed Aug. 20, 2008 by Robert F. Popoli.
Non-final Office action dated Dec. 16, 2011 in U.S. Appl. No. 12/127,718, filed May 27, 2008 by John L Norin.
Non-final Office action dated Dec. 19, 2011 in U.S. Appl. No. 11/820,446, filed Jun. 19, 2007 by Thomas H. James et al.

European Telecommunications Satellite Organization (EUTELSAT); Digital Satellite Equipment Control (DiSEqC): Application Information for Tuner-Receivers/IRDs; Apr. 12, 1996; pp. 1-25.
Final Rejection dated Jul. 22, 2011 in U.S. Appl. No. 12/195,256, filed Aug. 20, 2008 by Robert F. Popoli.
Non-final Office action dated Nov. 18, 2011 in U.S. Appl. No. 12/195,256, filed Aug. 20, 2008 by Robert F. Popoli.
Non-final Office action dated Sep. 14, 2012 in U.S. Appl. No. 13/566,193, filed Aug. 3, 2012 by Robert F. Popoli.
Final Rejection dated Sep. 18, 2012 in U.S. Appl. No. 11/810,774, filed Jun. 7, 2007 by Hanno Basse et al.
Final Rejection dated Aug. 22, 2012 in U.S. Appl. No. 12/127,718, filed May 27, 2008 by John L. Norin.
Final Rejection dated Oct. 9, 2012 in U.S. Appl. No. 13/093,642, filed Apr. 25, 2011 by Thomas H. James et al.
Final Rejection dated Apr. 18, 2013 in U.S. Appl. No. 13/566,193, filed Aug. 3, 2012 by Robert F. Popoli.
Final Rejection dated Feb. 8, 2013 in U.S. Appl. No. 11/820,446, filed Jun. 19, 2007 by Thomas H. James et al.
Non-final Office action dated Dec. 20, 2012 in U.S. Appl. No. 13/093,642, filed Apr. 25, 2011 by Thomas H. James et al.
Non-final Office action dated May 13, 2013 in U.S. Appl. No. 11/219,407, filed Sep. 2, 2005 by Thomas H. James et al.
Non-final Office action dated Apr. 18, 2013 in U.S. Appl. No. 11/097,481, filed Apr. 1, 2005 by Thomas H. James et al.
Notice of Allowance dated Mar. 14, 2013 in U.S. Appl. No. 11/097,724, filed Apr. 1, 2005 by Thomas H. James et al.
Non-final Office action dated Mar. 21, 2013 in U.S. Appl. No. 13/212,341, filed Aug. 18, 2011 by Thomas H. James et al.
Final Rejection dated Apr. 3, 2013 in U.S. Appl. No. 13/093,642, filed Apr. 25, 2011 by Thomas H. James et al.
Non-final Office action dated Jul. 31, 2013 in U.S. Appl. No. 13/093,642, filed Apr. 25, 2011 by Thomas H. James et al.
Non-final Office action dated Jun. 19, 2013 in U.S. Appl. No. 12/127,718, filed May 27, 2008 by John L. Norin.
Notice of Allowance dated Aug. 22, 2013 in U.S. Appl. No. 13/566,193, filed Aug. 3, 2012 by Robert F. Popoli.
Notice of Allowance dated Aug. 23, 2013 in U.S. Appl. No. 11/097,481, filed Apr. 1, 2005 by Thomas H. James et al.
Notice of Allowance dated Dec. 13, 2013 in U.S. Appl. No. 12/127,718, filed May 27, 2008 by John L Norin.
Final Rejection dated Oct. 7, 2013 in U.S. Appl. No. 11/219,407, filed Sep. 2, 2005 by Thomas H. James et al.
Final Rejection dated Oct. 25, 2013 in U.S. Appl. No. 11/820,446, filed Jun. 19, 2007 by Thomas H. James et al.
Non-final Office action dated Sep. 24, 2013 in U.S. Appl. No. 131223,204, filed Aug. 31, 2011 by John Norin et al.
Notice of Allowance dated Oct. 30, 2013 in U.S. Appl. No. 13/212,341, filed Aug. 18, 2011 by Thomas H. James et al.
Non-final Office action dated Sep. 12, 2013 in U.S. Appl. No. 131768,116, filed Feb. 15, 2013 by Hanno Basse et al.
Non-final Office action dated Jan. 24, 2014 in U.S. Appl. No. 14/042,599, filed Sep. 30, 2013 by Thomas H. James et al.

* cited by examiner

DIRECT BROADCAST SIGNAL DISTRIBUTION METHODS

TECHNICAL FIELD

The present invention relates generally to direct broadcast systems, and more particularly to methods and apparatuses for receiving broadcast signals within a direct broadcast system from an outdoor unit.

BACKGROUND OF THE INVENTION

Direct broadcast systems use various orbital slots, which correspond to different services including video and audio programming. Additional new services are continuously being offered for direct satellite broadcast system users. Typically when new services are offered existing direct satellite broadcast system components need to be replaced or altered to accommodate for the new services. The services are broadcasted via radio waves within the direct broadcast system.

Typical direct broadcast systems include a direct broadcast receiver for receiving direct broadcast signals. The direct broadcast receiver includes a low noise block converter (LNB) or a series of individual separate LNBs. The LNB(s) may be directly connected to an integrated receiver and decoder (IRD) or may be connected to a multi-switch followed by one or more IRD(s). The LNB(s) receive, combine, and amplify the direct broadcast signals. A program channel is selected on the IRD(s), which in turn may directly receive a direct broadcast signal having a particular frequency corresponding to the program channel from a particular LNB or may use the multi-switch to switch to a different LNB.

Typically, 32 different frequencies are transmitted on any particular satellite. The satellite splits the frequencies between two polarizations, left hand circularly polarized (LHCP) signals and right hand circularly polarized (RHCP) signals to increase efficiency and allow the frequencies to be packed closer together given a certain amount of bandwidth allocated to each frequency. Use of the RHCP signals and LHCP signals allows for an increased number of frequencies to exist on the same bandwidth and increases capacity of the satellite. Half of the frequencies are assigned to the RHCP signals and the other half of frequencies are assigned to the LHCP signals.

Each LNB can only receive one of the polarizations at any particular time. Thus, a LNB typically receives 16 frequencies at any point in time. Received polarization is determined by a direct current (DC) voltage control mechanism that is applied to an output of the LNB(s). The DC voltage is either +13V or +18V dependent on the polarization desired. Each LNB can then select a desired polarization and convert the satellite signal at approximately 15 GHz and translate it in frequency down to 950-1450 MHz, or a 500 MHz wide signal band. The 500 MHz wide signal band is the signal that is normally fed into the IRD(s). Each IRD then selects one of the 16 frequencies from the input spectrum and one or more channels contained within the chosen frequency.

A site may have multiple IRD(s), typically internal to the customer site, each of which requiring a separate wire to connect to the multi-switch or LNBs. The multi-switch allows multiple IRD(s) to access the entire available spectrum, up to approximately 32 frequencies on each satellite, requiring each tuner to be coupled to the multi-switch with an associated wire. Also, each IRD may have multiple tuners, especially in more advanced IRD(s) that offer advanced consumer features, such as watch and record, picture-in-picture, and independently acquired data feed features. Thus, each tuner requires a designated wire since currently used selection mechanisms are not designed to operate in a shared medium environment. For example, a three-tuner IRD requires three wires. Separate wires are used for two main reasons. First the control mechanism is DC coupled, which can cause interference between tuners that are using a single wire. Second the transmitted signals received by each tuner are at the same frequencies and having the same bandwidths, also causing conflict between signals.

The multiple wires increase the number of required ports on multiple system components and potentially require increased hole size in an exterior wall of a building to accommodate for additional wires between the LNB(s) and the IRD tuners. The multiple wires not only increase installation complexity but also decrease system esthetics.

Also, in order to accommodate system upgrades, such as additional satellite access, advanced modulation schemes, newly introduced frequency spectrums, or other system upgrades, existing IRD(s) are often replaced and system wiring is expanded.

Additionally, existing direct broadcast systems are bandwidth inefficient in that communication signals are distributed from satellites to sites at a larger bandwidth than required or used by a particular site. The larger bandwidth is received by the LNBs and distributed to the IRD(s), which only use a portion of the bandwidth associated with desired customer services.

It would therefore be desirable to minimize the number of wires between LNBs and IRD(s) within a direct broadcast system, thereby potentially minimizing system installation complexity, minimizing system costs, and improving system esthetics. It would also be desirable for the direct broadcast system to support both existing daisy chain wiring and site-run wiring architectures, minimize system adjustments when different satellites or broadcast bands are utilized, and minimize system upgrade costs.

SUMMARY OF THE INVENTION

The present invention has several advantages over existing direct broadcast systems. One advantage of the present invention is that it provides reception by multiple integrated receiver and decoders (IRD)s from an outdoor unit (ODU) via a single distribution cable. Thus, the present invention minimizes cables between the ODU and the IRD(s).

Another advantage of the present invention is that it supports existing daisy chain and site-run wiring architectures as well as accounting for cables having differing bandwidth capability.

Yet another advantage of the present invention is that it accounts for direct broadcast system updates by minimizing the amount of wiring, ODU, and IRD modifications to accommodate the updates.

Moreover, the present invention provides decreased distribution bandwidth from an ODU to IRD(s), thus, allowing for an increased number of IRD(s) per ODU and the ability of utilizing wireless distribution between the ODU and the IRD(s). Additionally, with a reduced amount of bandwidth being utilized by the IRD(s) an increased amount of independent streams of data can be viewed without the need for an additional tuner, as is typically required in prior art direct broadcast systems.

The present invention provides a method and apparatus of receiving a plurality of broadcast signals within a direct broadcast system from an outdoor unit. A direct broadcast system having a high altitude communication device that transmits broadcast signals, which are received by an antenna, is provided. The system includes an ODU electrically coupled to the antenna. The ODU includes a low noise block converter (LNB) that receives and amplifies the broadcast signals. An ODU receiver is electrically coupled to the ODU and selects a desired frequency of the broadcast signals. IRD(s) are electrically coupled to the ODU receiver via a single distribution cable. The IRD(s) convert the broadcast signals into IRD output signals. Methods of performing the same are also provided, herein, including a transport select method and a service select method for receiving the broadcast signals. A direct broadcast system installation method and wireless communication between the ODU and the IRD(s) are also provided.

The present invention itself, together with further objects and attendant advantages, will be best understood by reference to the following detailed description, taken in conjunction with the accompanying drawing.

BRIEF DESCRIPTION OF THE DRAWING

For a more complete understanding of this invention reference should now be had to the embodiments illustrated in greater detail in the accompanying figures and described below by way of example.

DETAILED DESCRIPTION OF THE PREFERRED EMBODIMENT

Figure 1:
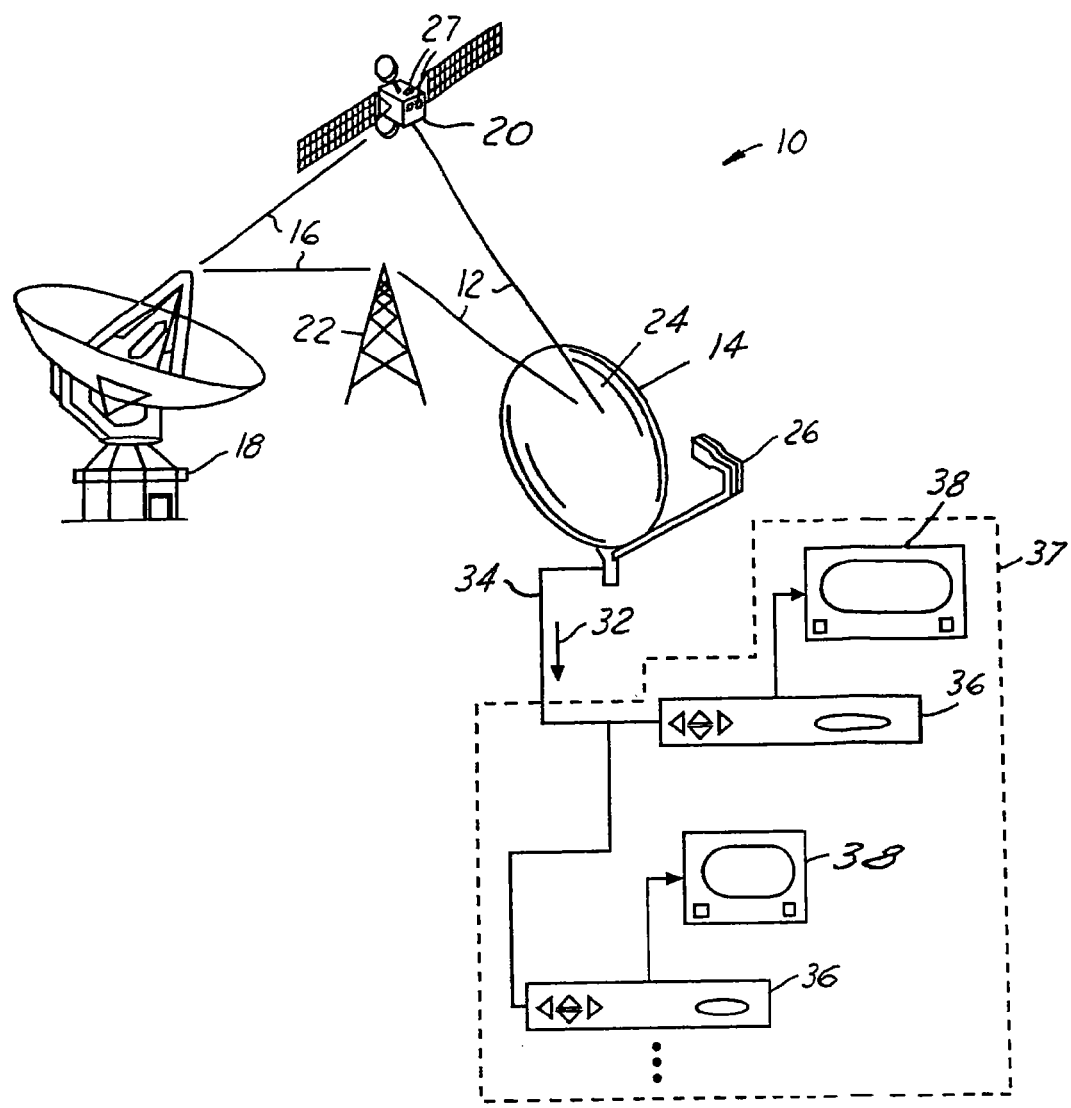
FIG. 1 is a schematic illustration view of a direct broadcast system, utilizing methods and apparatuses for receiving broadcast signals within a direct broadcast system from an outdoor unit in accordance with an embodiment of the present invention.

In each of the following figures, the same reference numerals are used to refer to the same components. While the present invention is described with respect to a method and apparatus for receiving a plurality of broadcast signals within a direct broadcast system from an outdoor unit, the following method is capable of being adapted for various purposes and is not limited to the following applications: direct broadcast systems, cable television networks, communication systems, or other terrestrial communication applications.

In the following figures the same reference numerals are used to refer to the same components. Also in the following description, various operating parameters and components are described for one constructed embodiment. These specific parameters and components are included as examples and are not meant to be limiting.

Also, in the following description the terms "single distribution cable" refer to a single coaxial style cable having an inner and outer conductor. Various coaxial style cables exist and may be utilized such as RG59 cable, RG6 cable, and other coaxial cable known in the art. Non-coaxial style cable may also be used that serves a similar purpose as the coaxial style cable mentioned.

Referring now to FIG. 1, a perspective view of a direct broadcast system 10, utilizing methods and apparatuses for receiving broadcast signals 12 within the direct broadcast system 10 from an outdoor unit (ODU) 14 in accordance with an embodiment of the present invention is shown. Radio frequency (RF) signals 16 are transmitted at one particular frequency from a ground-based station 18 to at least one high altitude device 20. The at least one device 20 transmits the RF signals 16 at a different frequency forming direct broadcast signals 12. The device 20 may be a satellite, a stratospheric platform or other communication device such as base tower 22. The direct broadcast signals 12 are received by a parabolic antenna 24 with an ODU receiver 26 from multiple transponders 27 within the device 20. Each transponder 27 transmits at a different frequency and each frequency is assigned to multiple customer services. The parabolic antenna 24 focuses the direct broadcast signals 12 to an ODU 14 located at a focal point of the antenna 24. The ODU 14 receives the direct broadcast signals 12 via a selection receiver 26. The selection receiver 26 converts the direct broadcast signals 12 into distribution signals or ODU receiver output signals 32, which are transferred by a single distribution cable 34 to integrated receivers and decoders (IRD(s)) 36 within a customer site 37. The IRD(s) 36 decode the programming on the output signals 32 for audio and visual display on one or more communication devices 38. The output signals 32 contain audio and video programming as well as data provided in direct broadcast transmission. Although, there is a given number of direct broadcast system devices shown, various numbers of devices may be utilized.

Figure 2:
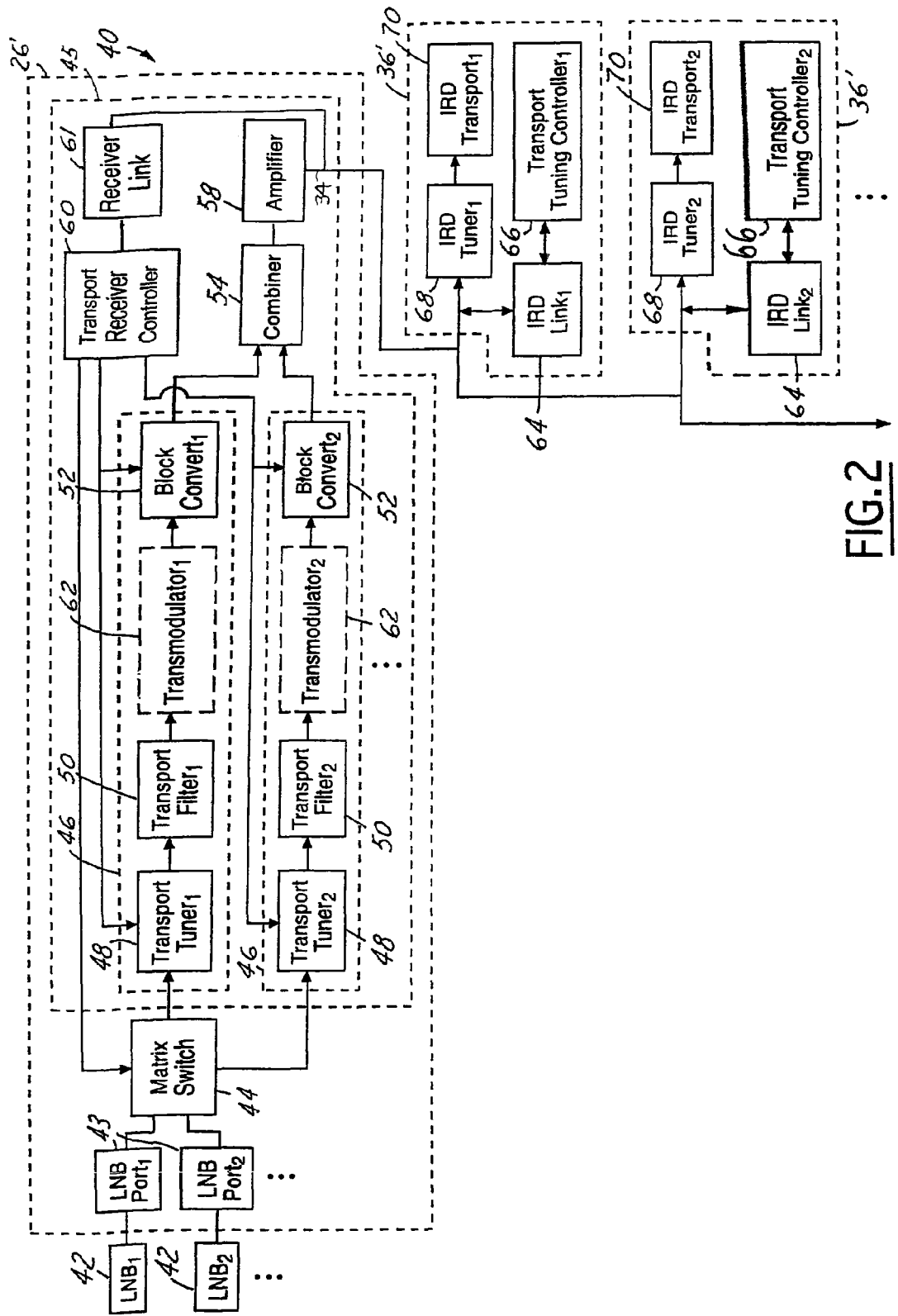
FIG. 2 is a block diagrammatic and schematic view of a transport select system in accordance with a preferred embodiment of the present invention.

Referring now to FIG. 2, a block diagrammatic and schematic view of a transport select system 40 in accordance with an embodiment of the present invention is shown. A transport ODU receiver 26' is electrically coupled to multiple IRD(s) 36' via the distribution cable 34. The transport receiver 26' is electrically coupled to multiple low noise block converters (LNBs) 42, via LNB ports 43, that receive the broadcast signals 12 from the transponders 27 having dual polarizations. For example, the device 20 may have 32 transponders, half of which are assigned to right-hand circular polarized (RHCP) signals and the other half assigned to left-hand circular polarized (LHCP) signals. Each LNB 42 receives polarized signals from determined transponders 27 at particular frequencies. Each LNB receives either a RHCP signal or a LHCP signal. The bandwidth of the broadcast signals may be 500 MHz, such that the transport select unit frequency ranges are approximately between 950-1450 MHz.

The LNBs 42 are electrically coupled to a transport LNB selector 45 via a matrix switch 44. The transport LNB selector 45 includes multiple transport select units 46, which are electrically coupled to the matrix switch 44. Each select unit 46 includes a transport tuner 48, a transport filter 50, and a block converter 52, which convert the broadcast signals into transport select unit output signals. The tuners 48 select a frequency received from the LNBs 42. For example, a particular LNB of interest may receive broadcast signals on 16 different frequencies, corresponding to a single polarization, and the tuners, that are switched to the LNB of interest, select broadcast signals on one of the 16 frequencies. The filters 50 aid the tuners 48 in filtering out unselected frequencies. The filters 50 may be an integral portion of the tuners 48 or may be separate devices as shown. The block converters 52 shift the broadcast signals at the selected frequency to a transport select unit frequency. A combiner 54 is electrically coupled to the block converters 52 and combines transport select unit output signals to form the ODU receiver output signal. The ODU receiver output signal is then amplified by the amplifier 58 before being received by the IRD(s) 36'.

The transport tuners 48 may combine demodulation and remodulation characteristics to reduce channel bandwidth of distributed signals. For example, a nominal satellite modulation scheme of QPSK at 27 MHz to carry 30 Mbps to 64 QAM can reduce bandwidth per channel to 4 MHz, thus increasing number of allowable IRD(s) per ODU receiver.

The frequencies distributed between the receiver 26' and the IRD(s) 36' may be configured to co-exist with other baseband frequencies such as phone, various types of digital subscriber line (xDSL), cable modem, or other broadband applications.

The transport LNB selector 45 also includes a transport receiver controller 60. The transport receiver controller 60 is electrically coupled to the matrix switch 44, the tuners 48, and the block converters 52. The transport receiver controller 60 is preferably microprocessor-based such as a computer having a central processing unit, memory (RAM and/or ROM), and associated input and output buses. The transport receiver controller 60 may be an integral part of a central unit, as shown, or may be a separate stand-alone device. The transport receiver controller 60 receives a content request signal from the IRD(s) 36' via a receiver link 61, and signals the matrix switch 44, the tuners 48, and the block converters 52 to perform accordingly.

The transport receiver controller 60 may also store capabilities of the LNBs 42 in order to switch between the LNBs 42. Alternatively, the LNBs 42 may be pre-assigned and hardwired to the LNB ports 43.

A transmodulator 62 may be electrically coupled between the filters 50 and the block converters 52 to alter modulation of the broadcast signals. The broadcast signals are transmitted at a predetermined modulation rate, whereby a determined amount of data is transmitted for a first bandwidth. In altering the modulation rate the determined amount of data is transferred for a second bandwidth which is smaller than the first bandwidth. Thus, decreasing the amount of bandwidth used for a given amount of data.

Additionally, due to the configuration of the present invention more than one IRD may utilize a single tuner. When a first IRD is requesting a service that is on a frequency as that of a second service for which a second IRD is requesting, each IRD may utilize the same tuner. The ability to share tuners and receiver resources is unlike that of prior art broadcast systems. The present invention thus can provide an increased number of resources that may be used by an individual IRD, than is normally cost effective to incorporate into an individual IRD.

In overview, the selection receiver 26' receives, transmodulates, and converts the dual polarized broadcast signals into the ODU receiver output signal, which utilizes a smaller amount of bandwidth to allow for use of the distribution cable 34 and for an increased number of IRD(s) over prior art systems. The present invention allows for multiple distribution signals to exist on the distribution cable 34, unlike that of the prior art in which each distribution cable has a single distribution signal.

The IRD(s) 36' are capable of determining the capabilities of the receiver and performing appropriate configuration adjustments. The IRD(s) 36' include multiple IRD links 64, which are electrically coupled to transport-tuning controllers 66. A service is selected by the transport-tuning controllers 66, which generate content request signals. Multiple IRD tuners 68, which are electrically coupled to the amplifier 58 via the distribution cable 34, receive and select the ODU receiver output signals at desired frequencies in response to the content request signals. Multiple IRD transports 70 are also electrically coupled to the IRD tuners 68 and convert the ODU receiver output signals into audio or video format for a particular communication device 38, as known in the art.

In order for the multiple tuners 48 and the multiple IRD(s) 36' to select signal content over shared media, a communication protocol is used. To accomplish the communication protocol, the receiver link 61 and the IRD links 64 may be in the form of broadband Ethernet interfaces or other interface devices known in the art. The IRD(s) 36' may diagnose and indicate, via the monitors 38, any pointing errors or hardware misconfigurations.

Figure 6:
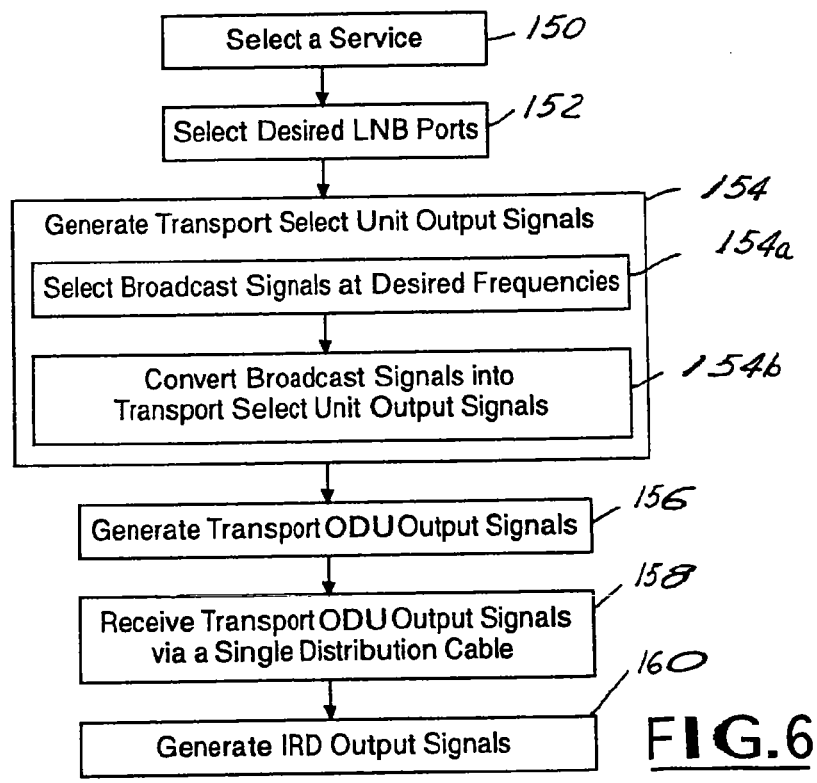
FIG. 6 is a logic flow diagram illustrating a transport select method for the transport select system in accordance with a preferred embodiment of the present invention.

The operation of the transport receiver 26' and the transport IRD(s) 36' is explained in further detail below and is illustrated in FIG. 6.

Figure 3:
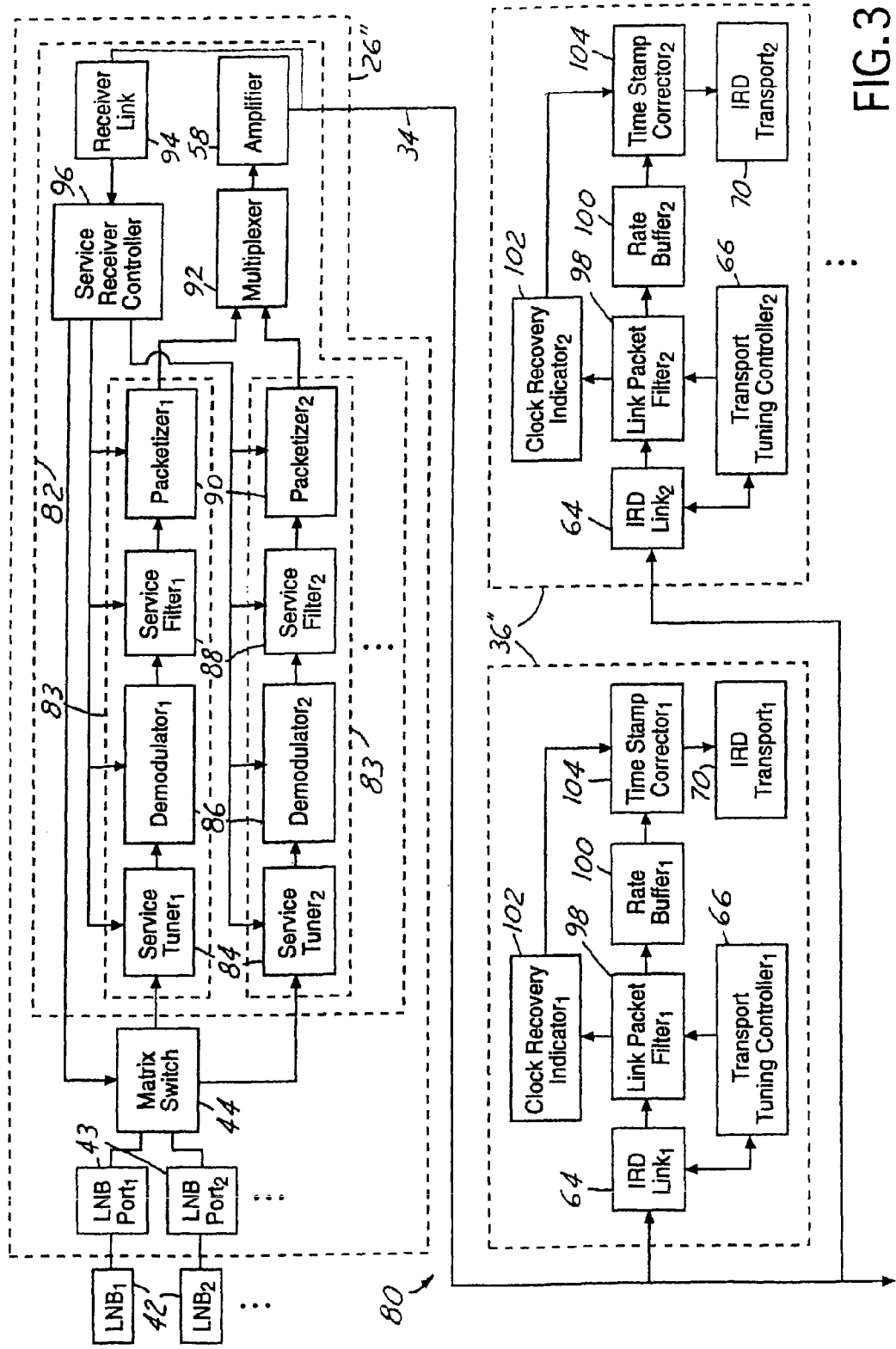
FIG. 3 is a block diagrammatic and schematic view of service select system in accordance with a preferred embodiment of the present invention.

Referring now to FIG. 3, a block diagrammatic and schematic view of a service select system 80 in accordance with an embodiment of the present invention is shown. The system 80 includes a service ODU receiver 26" and multiple IRD(s) 36". The service receiver 26" includes a service LNB selector 82 that is electrically coupled to the LNB 42 via the matrix switch 44. Unlike the transport LNB selector 43, the service LNB selector 82 generates service receiver output signals that contain selected channel signals for a selected service without other channel signals for unselected service on the same associated frequency. An associated frequency may contain numerous channel signals for various services. Each service has corresponding channel signals. When services are selected on the IRD(s) 36" the service LNB selector 82 provides the IRD(s) 36" with channel signals that correspond to the selected service without other channel signals that may be on the associated frequencies as the selected services.

The service LNB selector 82 includes service select units 83, a multiplexer 92, and a service receiver controller 96. The select units 83 select channels that correspond to selected services for transfer to the service IRD(s) 36". The multiplexer 92 is electrically coupled to the select units 83 and multiplexes service select unit output signals in time to generate the service receiver output signals. An amplifier 58 is electrically coupled to the multiplexer 92 and the service IRD(s) 36". The service select unit output signals are amplified before being received by the service IRD(s) 36". A receiver link 94 is electrically coupled to the service IRD(s) 36" and performs similarly to the receiver link 61.

The service receiver controller 96 is electrically coupled to the receiver link 94, the service tuners 84, the demodulators 86, the service filters 88, and the packetizers 90. The service receiver controller 96 operates the service tuners 84, the demodulators 86, the service filters 88, and the packetizers 90 in response to the content request signal. The service receiver controller 96 as with the transport receiver controller 60 is preferably microprocessor-based such as a computer having a central processing unit, memory (RAM and/or ROM), and associated input and output buses. The service receiver controller 96 may also be an integral part of a central unit, as shown, or, alternatively, may be a separate stand-alone device.

The service select units 83 include a service tuner 84, a demodulator 86, a service filter 88, and a packetizer 90. The service tuner 84 performs similarly as that of the transport tuner 48 in that it selects an associated frequency for a requested service. The demodulator 86 removes transmission modulation of the broadcast signals such as quaternary phase shift keying, quadrature amplitude modulation, and other forms of modulation known in the art. Unlike the transport filters 50 that select a frequency out of the above mentioned 16 frequencies, the service filters 88 demultiplex a selected frequency to select one or more channels out of approximately 10 channels contained therein. The packetizers 90 group channels corresponding with a selected service. For example, a selected service may have an associated audio channel, video channel, and data channel, which are combined to form the selected service.

The service select units further decrease distribution bandwidth between the service receiver 26" and the IRD 36" by efficient use of bandwidth. Bandwidth use is further reduced over the transport select system 40 by utilizing a reduced amount of bandwidth to distribute channels that correspond with a request service and not distributing channels that may correspond with a desired frequency from an LNB but do not correspond with a requested service.

The service IRD 36" include IRD links 64 and transport tuning controllers 66. Link packet filters 98 are electrically coupled to the IRD links 64 and select appropriate packets for selected services, on the transport-tuning controllers 66, corresponding to associated IRD(s) 36". A rate buffer 100 is electrically coupled to the link packet filters 98 and determines timing for the associated IRD(s) 36" and adjusts link packet filter output signals appropriately. A clock recovery indicator 102 is electrically coupled to the link packet filters 98. When channels are shifted in time for multiplexing and linking purposes, the clock recovery indicator 102 signals a time stamp corrector 104, which is electrically coupled to the rate buffer 100, to undo what the multiplexer 90 or the links 64 and 94 have done. The time stamp correctors 104 are electrically coupled to the IRD transports 70. It will be appreciated that the IRD(s) 36" do not include an IRD tuner but instead include broadband link circuitry such as the packet filters 98, buffer 100, indicator 102, and the corrector 104. The broadband link circuitry allows for use of a single link and flexibility to receive as many services as an IRD is capable of receiving.

Figure 7:
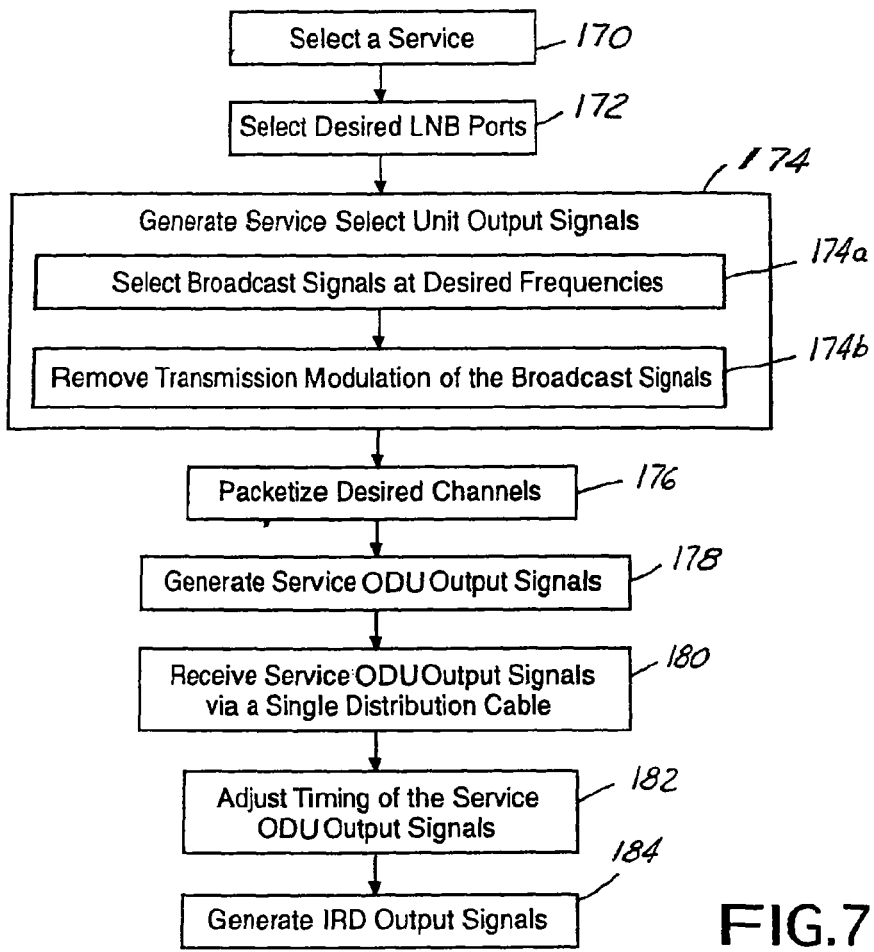
FIG. 7 is a logic flow diagram illustrating a service select method for the service select system in accordance with a preferred embodiment of the present invention.

The operation of the service receiver 26" and the service IRD(s) 36" is explained in further detail below and is illustrated in FIG. 7.

Demodulation is performed by the service receiver 26" and not within the service IRD 36" allowing for easy upgrade capability. Upgrades may be performed by simply adjusting or replacing the receiver 26" without modification to the existing IRD(s) 36".

Figure 4:
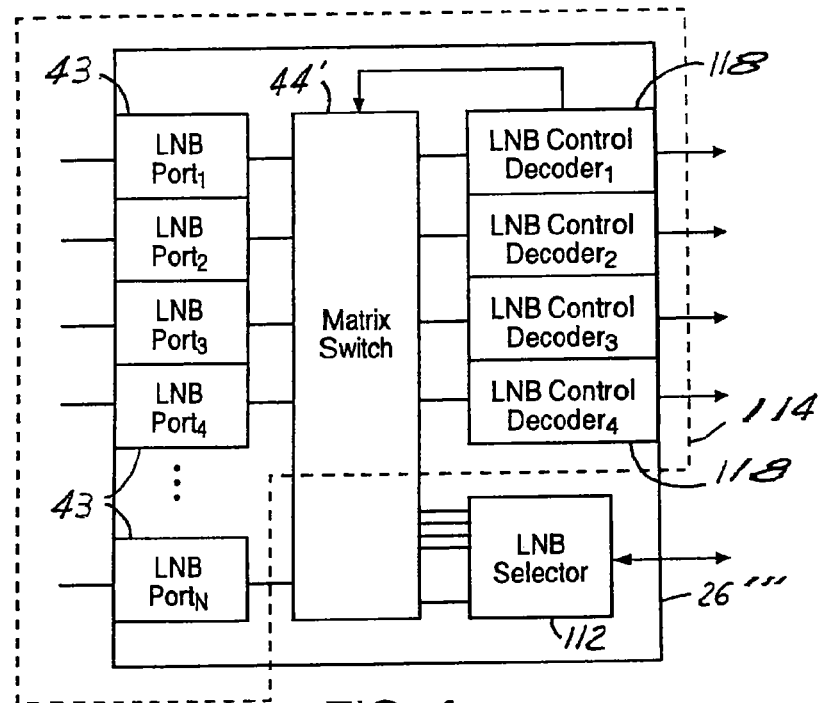
FIG. 4 is a block diagrammatic and schematic view of an ODU receiver integrating a standard multi-switch in accordance with a preferred embodiment of the present invention.

Referring now to FIG. 4, a block diagrammatic and schematic view of an ODU receiver 26''' integrating a standard multi-switch 110 in accordance with an embodiment of the present invention is shown. The receiver 26''' illustrates integration of an LNB selector 112, which may be either the transport LNB selector 45 or the service LNB selector 82, into a conventional multi-switch 114 for support of existing direct broadcast systems. The receiver 26''' allows conventional style IRD(s) to be combined with IRD(s) of the present invention such as IRD(s) 36' or 36", that use the transport select methods and service select methods, which are described in detail below.

The conventional multi-switch 114 has multiple LNB ports 43, a matrix switch 44', and LNB control decoders 118. The LNB control decoders 118 select LNBs 36" by using tone and/or voltage decoding methods known in the art. The matrix switch 44 is formed to accommodate both the LNB control decoders 118 and the LNB selector 112.

Figure 5:
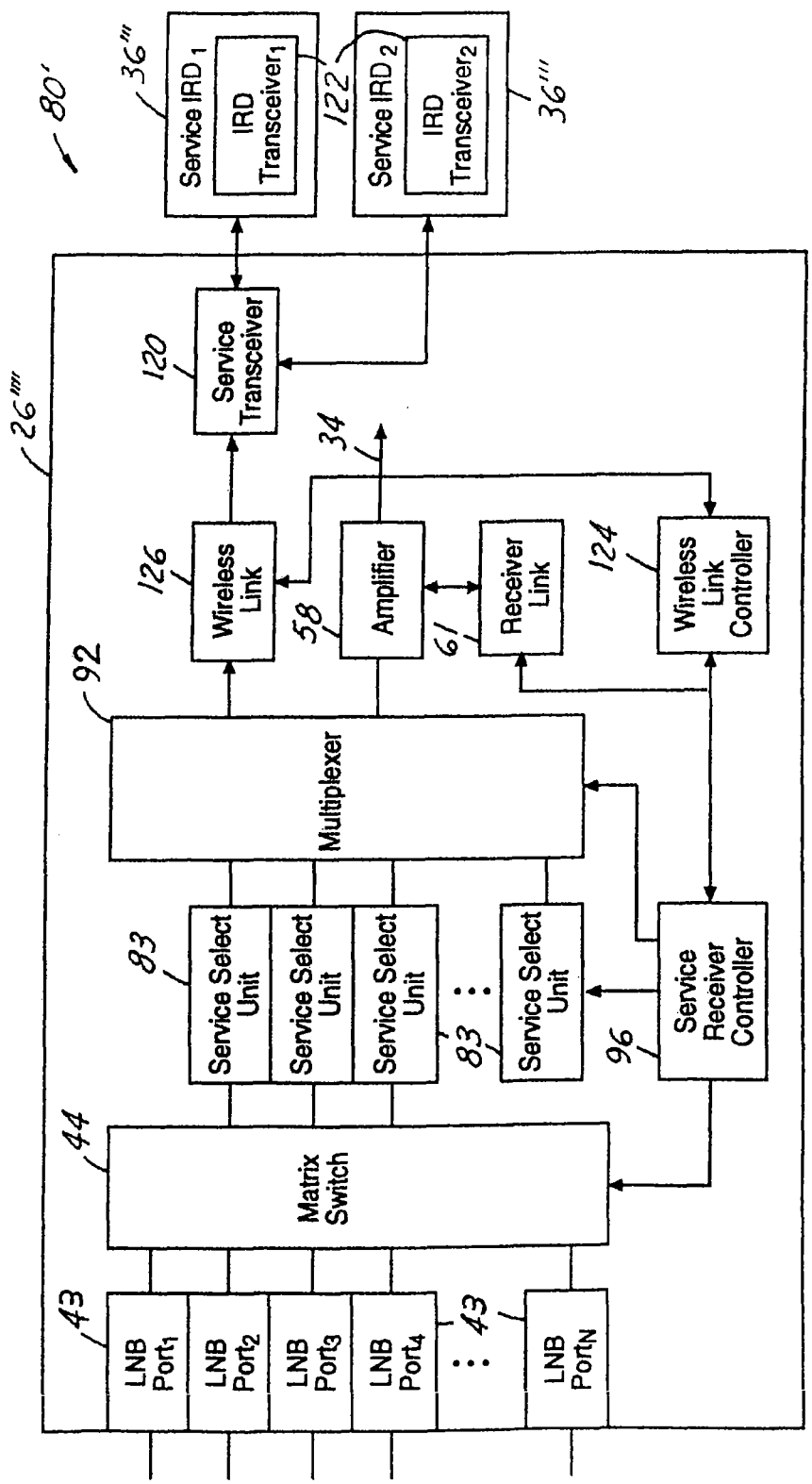
FIG. 5 is a block diagrammatic and schematic view of a direct broadcast receiver of the service select system for wireless communication in accordance with a preferred embodiment of the present invention.

Referring now to FIG. 5, a block diagrammatic and schematic view of a service receiver 26'''' of the service select system 80' for wireless communication in accordance with an embodiment of the present invention is shown. Since the service select system 80' significantly decreases the amount of signal bandwidth being utilized in the distribution of service receiver output signals from the service receiver 26'''' to service IRD(s) 36''', wireless communication is feasible between the service receiver 26'''' and the service IRD(s) 36'''. The service select system 80', as shown, accommodates for both wired and wireless communication between the service receiver 26'''' and the IRD(s) 36'''. Of course, the system 80' may be altered to accommodate only wireless communication.

For wireless communication the service receiver 26'''' and the service IRD(s) 36''' include a service transceiver 120 and an IRD transceiver 122, respectively. A wireless link controller 124 is electrically coupled between the service receiver controller 96 and a wireless link 126, which is electrically coupled to the service transceiver 120.

The wireless link controller 124 determines transmit and receive timing of the wireless link 126. Signals may be transmitted between the service receiver 26'''' and the service IRD(s) 36''' synchronously or sequentially, which is determined by the wireless link controller 124. The wireless link controller 124 may also be microprocessor-based such as a computer having a central processing unit, memory (RAM and/or ROM), and associated input and output buses. The wireless link controller 124 may also be an integral part of a central unit or, instead, may be a separate stand-alone device.

Although, wireless communication is described above for the service select system 80 it is also feasible and may be applied to the transport select system 40 or to other embodiments of the present invention.

The above-described system components and devices may be hardware based or software based when appropriate and depending upon the application.

Referring now to FIG. 6, a logic flow diagram illustrating a transport select method for the transport select system 40 in accordance with an embodiment of the present invention is shown.

A service is selected on the transport-tuning controllers 66 and the transport-tuning controllers 66 generate the content request signals, as generally indicated by step 150. The content request signals are received by the transport receiver controller 60 via the IRD links 64 and the receiver link 61.

The transport receiver controller 60 operates the matrix switch 44 and the transport select units 46 in order to select desired LNB ports 43 in response to the content request signals corresponding to frequencies that are associated with the selected services, as generally indicated by step 152. The transport receiver controller 60 determines which transponders 27 are associated with the selected services and operates the matrix switch 44 and the transport select units 46 such that the appropriate LNB(s) 42 are in communication with the appropriate transport select units 46. The transport select units 46 then receive the associated frequencies assigned to the selected services.

The transport select units 46 generate transport select unit output signals in response to broadcast signals received from the desired LNB ports 43, as generally indicated by step 154.

The transport tuners 48 in combination with the transport filters 50 select broadcast signals at desired frequencies, as generally indicated by step 154a.

The block converters 52 convert the broadcast signals at the desired frequencies into the transport select unit output signals, as generally indicated by step 154b. The block converters 52, within the assigned transport select units 46 then shift the broadcast signals on the associated frequencies to transport select unit frequencies.

The combiner 54 combines the transport select unit output signals to generate the transport ODU output signals, as generally indicated by step 156.

The IRD tuners 68 receive the transport ODU output signals via the distribution cable 34, as generally indicated by step 158, and select a desired transport ODU output signal corresponding to a selected service.

The IRD transports 70 upon receiving the ODU output signals prepares the transport ODU output signals for listening or viewing on the monitors 38, by generating IRD output signals, as generally indicated by step 160.

Referring now to FIG. 7, a logic flow diagram illustrating a service select method for the service select system 80 in accordance with an embodiment of the present invention is shown.

The transport-tuning controllers 66 generate the content request signals as in step 150 above and as generally indicated by step 170.

The service receiver controller 96 selects desired LNB ports 43 in response to the content request signals, as generally indicated by step 172. Similar to the transport receiver controller 60, the service receiver controller 96 operates the matrix switch 44 and the service select units 83 to assure that appropriate LNB 42 are in communication with appropriate service select units 83.

The service select units 83 select channels associated with the desired LNB ports and the selected services and generates the service select unit output signals, as generally indicated by step 174.

The service tuners 84 and the service filters 88, as with the transport tuners 48 and transport filters 50, select broadcast signals at desired frequencies in response to the service select signals, as generally indicated by step 174a. The service filters 88 receive a service channel identifier (SCID) list so as to filter out SCID numbers that do not correspond with channels of selected services.

The demodulators 86 remove transmission modulation of the broadcast signals, as stated above and as generally indicated by step 174b.

The packetizers 90 packetize the desired channels in response to the service select signals, as generally indicated by step 176. Packets that were initially transported via the broadcast signals are wrapped within another packet to be received over the distribution cable or via wireless communication. An identifier is added to each packet so that the IRD(s) 36″ are able to de-multiplex the packets. In one embodiment of the present invention, real time stream carrying frequencies or channels are unidirectional to minimize signal collisions. Other non-real time stream carrying frequencies may be separate multiple access channels.

The multiplexer 92 multiplexes the service select unit output signals to generate the service ODU output signals, as generally indicated by step 178.

The link packet filters 98 receive the service ODU output signals via the distribution cable 34 and links 61 and 64, as generally indicated by step 180.

The rate buffer 100, the clock recovery indicator 102, and the time stamp corrector 104 adjust timing of the service ODU output signals to generate corrected output signals and to account for the multiplexing within the service receiver 26″, as generally indicated by step 182.

The IRD transports 70 upon receiving the correct output signals prepare the corrected output signals for listening or viewing on the monitors 38, by generating IRD output signals, similar to step 160 and as generally indicated by step 184.

Figure 8:
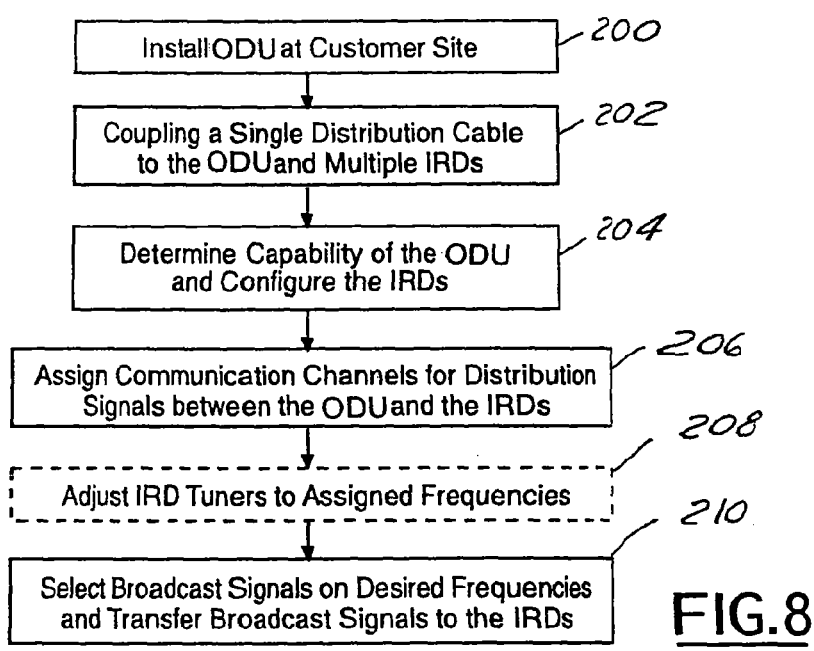
FIG. 8 is a logic flow diagram illustrating a direct broadcast system installation method in accordance with a preferred embodiment of the present invention.

Referring now to FIG. 8, a logic flow diagram illustrating a direct broadcast system installation method in accordance with an embodiment of the present invention is shown. The ODU 14 is installed at a customer site 37, as generally indicated by step 200. The distribution cable 34 is coupled to the ODU 14 and to the IRD(s) 36, as generally indicated by step 202. The IRD(s) 36 generate ODU capability request signals to determine capability of the ODU 14, as generally indicated by step 204. The IRD(s) 36 are configured in response to the ODU capability request signal. The IRD(s) 36 utilize the ODU capability request signal for future tuning requests of the ODU 14.

The ODU 14 allocates and assign communication channels or frequencies for distribution of signals between the ODU 14 and the IRD(s) 36, as generally indicated by step 206. For the transport select system 40, the IRD tuners 68 then adjust to the assigned frequencies, as generally indicated by step 208. The ODU 14 selects broadcast signals on desired frequencies, corresponding to selected services, and transfers the broadcast signals to the IRD(s) 36 on the assigned channels, as generally indicated by step 210.

The above-described steps are meant only to be an illustrative example. It will be understood that the steps may be performed synchronously or in a different order depending upon the application.

The present invention provides a method of receiving a plurality of broadcast signals from an ODU within a direct broadcast system that supports various wiring topologies. The present invention reduces bandwidth of transmission of distributed signals between an ODU and multiple IRD(s). In an end-to-end system sense, the present invention reduces cost and increases functionality. An IRD has an increased number of tuner resources due to the pooling of IRD resources. Also, system upgrades may occur at the ODU without having to change IRD(s) or existing wiring that is internal to a customer site.

The above-described method, to one skilled in the art, is capable of being adapted for various purposes and is not limited to the following applications: direct broadcast systems, cable television networks, communication systems, or other terrestrial communication applications. The above-described invention may also be varied without deviating from the true scope of the invention.

What is claimed is:

1. A system for delivering a plurality of broadcast signals, each of the broadcast signals having a plurality of channels, each of the plurality of channels transmitting data and being defined according to a broadcast channel division scheme, the system comprising:
   a selector for selecting individual broadcast signals from the plurality of broadcast signals; and
   a receiver, remote from the selector, the receiver configured to communicate with the selector via a bi-directional link, wherein the receiver requests data transmitted on a requested one of the plurality of broadcast channels of one of the individual broadcast signals selected by the selector and the receiver receives the requested data on the requested broadcast channel according to the broadcast channel division scheme using a communications channel of the bi-directional link uniquely assigned to the requesting receiver;
wherein:
the receiver bi-directional link is a wireless communications link; and
the selector is configured to communicate with a plurality of receives via the bi-directional link, each of the plurality of receivers communicating with the selector using a communications channel of the bi-directional link uniquely assigned to the requesting one of the plurality of receivers.

2. The system of claim 1, wherein the plurality of receivers each comprise at least one tuner, the at least one tuner being adapted for wireless communication with the selector.

3. The system of claim 2, wherein each of the least one tuners transmits at least one content request signal to the selector, wherein the selector generates at least one adjustment signal in response to the at least one content request signal.

4. The system of claim 1, wherein the selector uses a single nines to tune to the selected individual broadcast signal where data transmitted on separate portions of the selected individual broadcast signal are requested by two or more receivers in the plurality of receivers.

5. The system of claim 1, wherein the selector further comprises a transmodulator for reducing bandwidth of the selected individual broadcast signal.

6. The system of claim 1, further comprising a high altitude device for delivering the plurality of broadcast signals to the selector.

7. A system for receiving said plurality of broadcast signals, comprising:
an outdoor unit (ODU) electronically coupled to receive the plurality of broadcast signals and comprising at least one low noise block converter (LNB) for and amplifying said received broadcast signals;
an ODU receiver electrically coupled to said ODU and operable to select a desired frequency of said broadcast signals; and
at least one of a plurality of integrated receiver and decoders (IRD(s)) communicating with the ODU receiver via a bidirectional wireless link, wherein the at least one of the plurality of IRD(s) wirelessly requests and receives data transmitted on the desired frequency of the broadcast signals on a broadcast channel associated with an individual Service Channel Idenetifier (SCID) on a unique communications channel of the bi-directional wireless link assigned to the at least one of the plurality of IRDs;
wherein the ODU receiver does not transmit other data on the unique communications channel of the bi-directional wireless link assigned to the at least one of the plurality of IRDs, said other data consisting of data not requested by the at least one of the plurality of IRDs and requested by other IRDs of the plurality of IRDs.

8. The system of claim 7, wherein said plurality of IRD(s) comprises at least one IRD tuner, and said at least one IRD tuner is adapted for wireless communication with said at least one LNB via said wireless link.

9. The system of claim 8, wherein said at least one IRD tuner is operable to transmit at least one content request signal to said ODU, which is operable to generate at least one LNB adjustment signal in response to said at least one content request signal.

10. The system of claim 7, wherein said ODU receiver comprises:
a plurality of LNB ports electrically coupled to said at least one LNB;
a matrix switch electrically coupled to said plurality of LNB ports and operable to select at least one desired LNB port of the plurality of LNB ports;
at least one LNB selector electrically coupled to said matrix switch and operable to select at least one frequency associated with said at least one desired LNB port and generate at least one transport select output signal;
a combiner electronically coupled to said at least one LNB selector and operable to combine said at least one transport select output signal so as to generate an LNB selector output signal; and
a receiver controller electrically coupled to said matrix switch and said at least one LNB selector for operating said matrix switch and said at least one LNB selector in response to at least one content request signal.

11. The system of claim 10, wherein said at least one LNB selector comprises:
a transport tuner electrically coupled to said matrix switch and operable to select the desired frequency;
a filter electrically coupled to said transport tuner and operable to filter broadcast signals at said desired frequency; and
a block converter electrically coupled to said filter and operable to convert said desired frequency into an LNB selector frequency.

12. The system of claim 7, wherein said plurality of IRD(s) comprise:
a transport-tuning controller for generating a content request signal in response to a customer request;
an IRD transceiver electrically coupled to said transport-tuning controller and operable to transmit said content request signal to an LNB selector;
an IRD tuner for receiving receiver output signals in response to said IRD transceiver transmission; and
an IRD transport electrically coupled to said IRD tuner and operable to convert said receiver output signals into IRD output signals.

13. The system of claim 7, wherein said ODU receiver comprises at least one tuner, and wherein a first IRD of the plurality of IRDs utilizes a tuner of said at least one tuner that is utilized by a second IRD of the plurality of IRDs.

14. The system of claim 7, wherein said ODU further comprises a multi-switch including:
a plurality of LNB ports;
a matrix switch electrically coupled to said plurality of LNB ports and operable to select at least one LNB port of said plurality of LNB ports;
at least one LNB control decoder port electrically coupled to said matrix switch and operable to decode content request signals; and
an LNB selector electrically coupled to said matrix switch and operable to select the desired frequency of said broadcast signals.

15. The system of claim 7, wherein said ODU further comprises a transmodulator for reducing bandwidth of at least one of said broadcast signals over said wireless link.

16. The system of claim 7, wherein said ODU receiver comprises:
a plurality of LNB ports electrically coupled to said at least one LNB;
a matrix switch electrically coupled to said plurality of LNB ports for selecting at least one desired LNB port;

at least one LNB selector for selecting at least one channel associated with said at least one desired LNB port and generating at least two service select unit output signals;

a multiplexer for combining said at least two service select unit output signals to generate a receiver output signal; and a receiver controller for operating said matrix switch and said LNB selector in response to at least one content request signal.

17. The system of claim 16, said system comprising:

a service transceiver electrically coupled to said LNBs; and an IRD transceiver for transmitting and receiving said broadcast signals to and from said service transceiver;

wherein said plurality of IRD(s) are electrically coupled to said IRD transceiver and operable to convert said broadcast signals into said IRD output signals.

18. The system of claim 16, wherein said at least one LNB selector comprises:

a service turner electrically coupled to said matrix switch and operable to select a desired frequency in response to said content request signal;

a demodulator electrically coupled to said service tuner and operable to remove a transmission modulation from at least a portion or said broadcast signals so as to form demodulated broadcast signals;

a transport filter electrically coupled to said demodulator and operable to filter said demodulated broadcast signals at said desired frequency; and a packetizer electrically coupled to said transport filter and operable to packetize at least one channel associated with said desired frequency.

19. The system of claim 16, wherein said plurality of IRD(s) comprise:

a transport-tuning controller for generating a content request signal in response to a customer request;

an IRD transceiver electronically coupled to said transport-tuning controller and operable to transmit said content request signal to said LNB selector;

a link packet filter for receiving receiver output signals in response to said IRD transceiver transmission;

a rate buffer electrically coupled to said h k packet filter and operable to determine timing of an IRD of said plurality of IRD(s);

a clock recovery indicator electrically coupled to said rate buffer and operable to generate a clock recovery signal in response to said receiver output signals;

a time stamp correction device electrically coupled to said rate buffer and operable to correct timing of said receiver output signals so as to generate corrected output signals; and a transport unit electrically coupled to said time stamp correction device and operable to convert said corrected output signals into said IRD output signals.

20. The system of claim 7, wherein said ODU receiver is integrated within said ODU.

21. A system for receiving a plurality of broadcast signals, comprising:

an outdoor unit (ODU) comprising a low noise block converter (LNB) for receiving and amplifying the plurality of broadcast signals;

an ODU receiver electrically coupled to said ODU and operable to select a desired broadcast signal of the plurality of broadcast signals, the desired broadcast signal having a plurality of broadcast channels defined according to a broadcast channel division scheme and each of the broadcast channels transmitting content;

a service transceiver electrically coupled to said ODU receiver;

at least one integrated receiver decoder (IRD) transceiver of a plurality of IRD transceivers, for transmitting a request for content to said service transceiver and receiving transmitted content from the service transceiver on a wireless communication channel unique to the IRD transceiver; and wherein the requested content is received by the ODU on an individual broadcast channel associated with a Service Channel Identifier (SCID) and the transmitted content excludes other data consisting of data not requested by the at least one IRD transceiver and requested by another of the IRD transceivers.

22. The system of claim 21, said system comprising:

a wireless link between said service transceiver for interfacing said plurality of IRD(s) with said ODU receiver; and a wireless link controller coupled to said wireless link and operable to determine transmit and receive timing of said wireless link.

23. A direct broadcast system installation method for a direct broadcast system, said method comprising:

wirelessly coupling an outdoor unit (ODU) to at least one of a plurality of receivers such that wireless communications occurs between the ODU and the plurality of receivers in a bidirectional manner;

generating an ODU capability request signal to determine capability of the ODU;

configuring said at least one of a plurality of receivers in response to said ODU capability request signal;

allocating and assigning unique communication channels for distribution of signals between said ODU and each receiver in said plurality of receivers;

selecting a requested subset of broadcast signals each on desired frequencies corresponding to selected services; and transferring said broadcast signals to each receiver in said plurality of receivers on said unique assigned channels, wherein each receives in the plurality of receivers wirelessly receives broadcast signals excluding other data consisting of data not requested by the receiver and requested by another of the plurality of receivers.

24. The method of claim 23, wherein the step of wirelessly coupling said ODU to a plurality of IRD(s) is accomplished with at least one transceiver and a wireless link.

25. An apparatus for delivering a plurality of broadcast signals, each of the broadcast signals having a plurality of broadcast channels defined according to a broadcast channel division scheme and each of the broadcast channels transmitting data, the apparatus comprising;

a selector, configured to:

communicate with at least one of a plurality of receivers associated with the selector is a bi-directional communication link on a bi-directional communication link channel unique among the plurality of receivers;

select a broadcast signal in response to a request for the data transmitted on a requested one of the plurality of broadcast channels, the request received from the at least one of a plurality or receivers on the unique channel of the bi-directional communication link; and transmit the data transmitted on the requested one of the plurality of channels to the requesting receiver according to the broadcast channel division scheme using the unique channel of the bi-directional link;

wherein the selector does not transmit other data transmitted on the other of the plurality of broadcast channels and requested by the other receivers of the plurality of receivers on the unique channel of the bi-directional link.

* * * * *